(12) United States Patent
Lindgren

(10) Patent No.: US 11,403,694 B2
(45) Date of Patent: Aug. 2, 2022

(54) SYSTEM AND METHOD FOR INTELLIGENT CONTEXT-BASED PERSONALIZED BEAUTY PRODUCT RECOMMENDATION AND MATCHING

(71) Applicant: YUTYBAZAR Limited, London (GB)

(72) Inventor: Simi Lindgren, London (GB)

(73) Assignee: YUTYBAZAR Limited, London (GB)

( * ) Notice: Subject to any disclaimer, the term of this patent is extended or adjusted under 35 U.S.C. 154(b) by 0 days.

(21) Appl. No.: 17/379,862

(22) Filed: Jul. 19, 2021

(65) Prior Publication Data

US 2022/0020077 A1 Jan. 20, 2022

Related U.S. Application Data

(60) Provisional application No. 63/053,003, filed on Jul. 17, 2020.

(51) Int. Cl.
| | |
|---|---|
| *G06Q 30/06* | (2012.01) |
| *G06F 16/9538* | (2019.01) |
| *G06T 7/00* | (2017.01) |
| *G06V 40/16* | (2022.01) |
| *G06F 16/9535* | (2019.01) |

(52) U.S. Cl.
CPC ..... *G06Q 30/0631* (2013.01); *G06F 16/9535* (2019.01); *G06F 16/9538* (2019.01); *G06T 7/0012* (2013.01); *G06V 40/161* (2022.01); *G06T 2207/30088* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,381,105 B1 | 8/2019 | Tran et al. | |
| 10,614,921 B2 | 4/2020 | Shen et al. | |
| 11,126,826 B1* | 9/2021 | Karakas | G06K 9/4628 |
| 2003/0065578 A1 | 4/2003 | Peyrelevade et al. | |
| 2019/0237194 A1* | 8/2019 | Salvi | G16H 10/60 |
| 2020/0321074 A1* | 10/2020 | Tran | G16B 20/20 |

FOREIGN PATENT DOCUMENTS

FI    3598373    *  7/2018

* cited by examiner

*Primary Examiner* — Nancy Bitar
(74) *Attorney, Agent, or Firm* — Galvin Patent Law LLC; Brian R. Galvin; Brian S. Boon

(57) ABSTRACT

A system and method for intelligent context-based personalized beauty product recommendation and matching, comprising a data extraction engine, individual profiles of intended users stored in one or more user databases, one or more product databases, a skin analysis engine, and a data analysis and recommendation engine, which gathers a plurality of customer responses regarding fact-based input including locational data, concern-based input, preference-based input, and goal-based input, winch uses the customer responses and environmental conditions to create a requirement vector, and which uses the requirement vector as an input into one or more machine and deep learning algorithms to generate as output personalized beauty product recommendations.

14 Claims, 15 Drawing Sheets

End User Device 170

Individual Beauty Product Recommendations 500

510

-- Hair Pre-Shampoo: natural and fragrance free (Product A)
-- Hair Shampoo: natural and fragrance free (Product B)
-- Hair Conditioner: natural and fragrance free (Product C)
-- Hair Mask: natural and fragrance free (Product D)
-- Hair Thermal Protection: natural and fragrance free spray (Product E)

520

-- Skin Moisturizer: natural and fragrance free, with Hyaluronic Acid (Product F)
-- Skin Cleanser: natural and fragrance free (Product G)
-- Skin Toner: natural and fragrance free, with BHA (Product H)
-- Sunscreen: natural and fragrance free, with zinc oxide (Product I)
-- Skin Serum: natural and fragrance free, with Lactobacillus/Punica Granatum Fruit Ferment Extract (Product J)

Fig. 5

SYSTEM AND METHOD FOR INTELLIGENT CONTEXT-BASED PERSONALIZED BEAUTY PRODUCT RECOMMENDATION AND MATCHING

CROSS-REFERENCE TO RELATED APPLICATIONS

Priority is claimed in the application data sheet to the following patents or patent applications, the entire written description of each of which is expressly incorporated herein by reference in its entirety: 63/053,003

BACKGROUND

Field of the Art

The disclosure relates to the field of recommendation systems, and more particularly to the field of personalized beauty product recommendation systems.

Discussion of the State of the Art

Exterior beauty often concerns tine interaction of discrete elements such as hair, skin, complexion and the like. When addressing these elements, individuals can have different needs, concerns, and goals. Examples of different needs include oily and combination skin, hair porosity and scalp condition. Examples of different concerns include acne and breakouts, fine lines, wrinkles, dull and flat hair, sensitive scalp and the like. Examples of goals include clear and decongest, refresh and hydrate skin, condition and repair hair, and tame frizz among others.

When addressing beauty-related products, individuals can have poor experiences, such as the inability to access products that they may need, endless trial and error of unsuitable products, an accumulation of products which do not serve their needs, and the associated waste of money and time.

What is needed is a system and method for intelligent context-based personalized beauty product recommendation and matching which takes advantage of an individual's beauty-related needs, concerns, goals, and environment in order to more efficiently match the individual to beauty-related products.

SUMMARY

Accordingly, the inventor has conceived and reduced to practice, a system and method for intelligent context-based personalized beauty product recommendation and matching, comprising a data extraction engine, individual profiles of intended users stored in one or more user databases, one or more product databases, a skin analysis engine, and a data analysis and recommendation engine, which gathers a plurality of customer responses regarding fact-based input including locational data, concern-based input, preference-based input, and goal-based input which uses the customer responses and environmental conditions to create a requirement vector, and which uses the requirement vector as an input into one or more machine and deep learning algorithms to generate as output personalized beauty product recommendations.

According to a preferred embodiment, a system for intelligent context-based personalized beauty product recommendation and matching, is disclosed comprising: a computer system comprising a memory and a processor; a data extraction engine, comprising a first plurality of programming instructions stored in the memory and operating on the processor, wherein the first plurality of programming instructions, when operating on the processor, causes the computer system to: scrape product data from a plurality of data sources accessible via the internet; store the scraped product data as a product vector in the memory; receive customer data input responses, the customer data input responses comprising at least a fact-based input, at least a concern-based input, at least a preference-based input, and at least a goal-based input; create an individual profile of the customer using the customer data input responses and store the individual profile in the memory; and map the customer data input responses to product requirements and store the mapped customer data input responses in the individual profile; and a data analysis and recommendation engine, comprising a second plurality of programming instructions stored in the memory and operating on the processor, wherein the second plurality of programming instructions, when operating on the processor, causes the computer system to: retrieve the individual profile from the memory; retrieve the fact-based input responses and extract environmental conditions from a locational input included in the fact-based input; combine the mapped customer data input responses and the extracted environmental conditions into a requirement vector; retrieve one or more product vectors from the memory; compute the similarity between the requirement vector and the one or more product vectors; identify the product associated with the product vector that has the highest computed similarity score; and display the identified products as recommended products to the customer.

According to a second preferred embodiment, a method for intelligent context-based personalized beauty product recommendation and matching, is disclosed comprising the steps of: scraping product data from a plurality of data sources accessible via the internet; storing the scraped product data as a product vector in the memory; receiving customer data input responses, the customer data input responses comprising at least a fact-based input, at least a concern-based input, at least a preference-based input, and at least a goal-based input; creating an individual profile of the customer using the customer data input responses and store the individual profile in the memory; mapping the customer data input responses to product requirements and storing the mapped customer data input responses in the individual profile; retrieving the individual profile from the memory; retrieving the fact-based input responses and extract environmental conditions from a locational input included in the fact-based input; combining the mapped customer data input responses and the extracted environmental conditions into a requirement vector; retrieving one or more product vectors from the memory; computing the similarity between the requirement vector and the one or more product vectors; identifying the product associated with the product vector that has the highest computed similarity score; and displaying the identified product as a recommended product to the customer.

According to various aspects of the invention; the product data includes ingredients, chemical composition, functions of ingredients, allergens, ingredient free data, benefits, use, and product source information; wherein the customer data input responses are received from a questionnaire; the customer data input responses are received from an interactive chat bot; further comprising a skin analysis engine, comprising a third plurality of programming instructions stored in the memory and operating on the processor, wherein the third plurality of programming instructions, when operating on the processor, causes the computer system to: receive a photograph of the customer; perform face detection on the photograph; extract a face oval from the photograph; eliminate non-skin areas from the extracted face oval; analyze the extracted face oval with eliminated non-skin areas to generate as outputs a predicted skin-tone and a predicted skin concern; store the outputted skin-tone and skin concern in the individual profile; and forward the outputted skin-tone and skin concern to the data analysis and recommendation engine; the data analysis and recommendation engine receives the outputted skin-tone and skin concern and combines them into the requirement vector.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 5 is a diagram illustrating an exemplary recommended product list, according to an embodiment.

DETAILED DESCRIPTION

Figure 1:
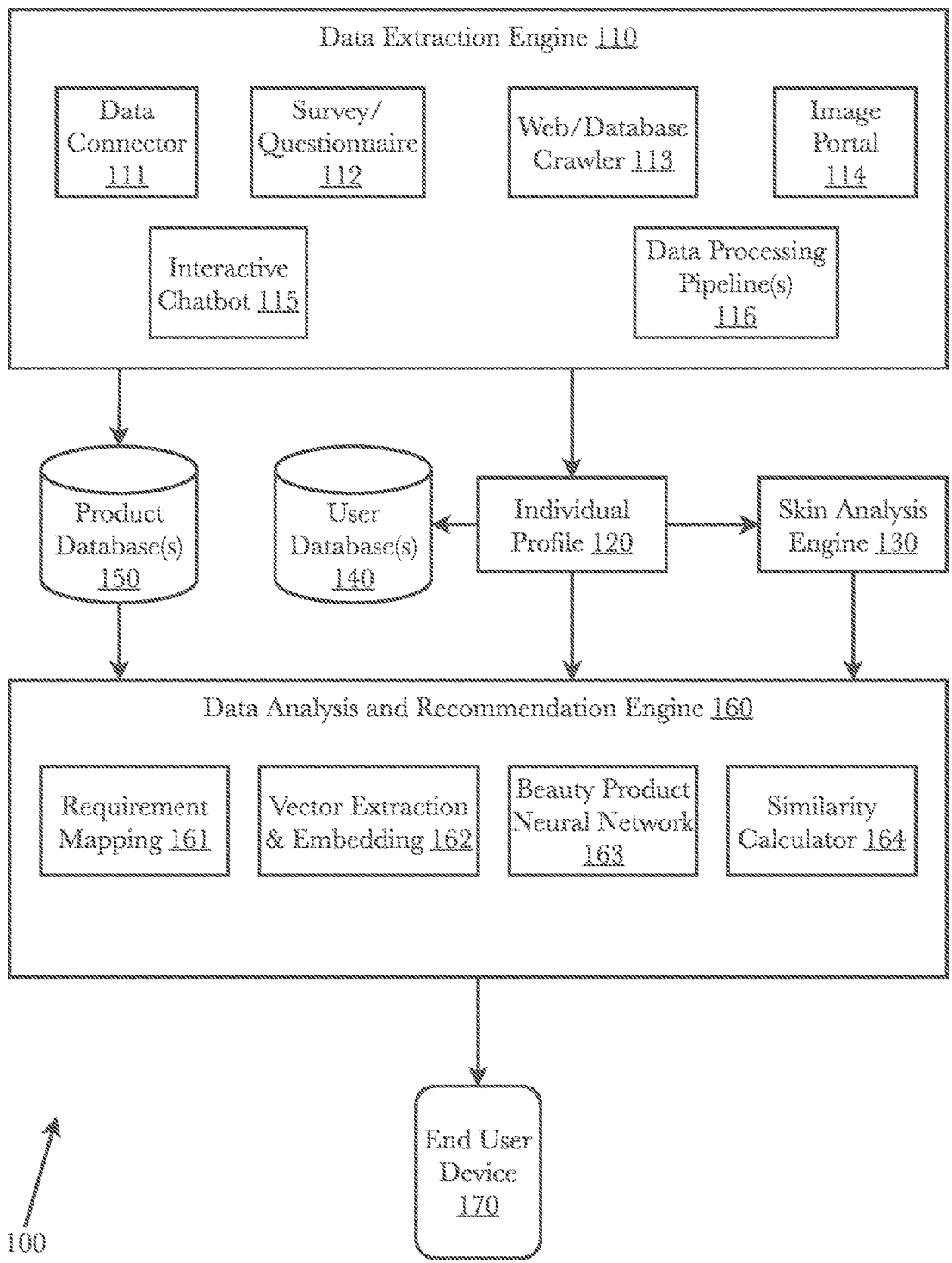
FIG. 1 is a block diagram illustrating an exemplary system architecture for matching individuals with personalized beauty product recommendations, according to an embodiment.

The inventor has conceived, and reduced to practice, a system and method for intelligent context-based personalized beauty product recommendation and matching, comprising a data extraction engine, individual profiles of intended users stored in one or more user databases, one or more product databases, a skin analysis engine, and a data, analysis and recommendation engine, which gathers a plurality of customer responses regarding fact-based input including locational data, concern-based input, and goal-based input, which uses the customer responses and environmental conditions to create a requirement vector, and which uses the requirement vector as an input into one or more machine and deep learning algorithms to generate as output personalized beauty product recommendations.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described reference to one or more particular aspects or figures that form a part of the present disclosure, and in which are shown, by way of illustration, specific arrangements of one or more of the aspects. It should he appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Beauty product" as used herein refers to a class of products including, but not limited to, cosmetics, personal care, skin care, fragrances, hair care, make up, lipstick, and body care. Skin care products may be used to cleanse, exfoliate, protect, and replenish the skin through the use of cleansers, toners, serums, moisturizers, and balms. Beauty products may be constituted from a mixture of chemical compounds derived from either natural sources and/or synthetically created ones.

Conceptual Architecture

FIG. 1 is a block diagram illustrating an exemplary system architecture for matching individuals with personalized beauty product recommendation 100, according to an embodiment. According to an embodiment, the system 100 may comprise a data extraction engine 110, individual profiles 120, one or more user databases 140, one or more product databases 150, a skin analysis engine 130, and a data analysis and recommendation engine 160.

According to an embodiment, data extraction engine 110 may retrieve, receive, or otherwise obtain a plurality of information related to system users and beauty, hygiene, and health related products. User information and product information may be obtained via a variety of mechanisms such as a data connector 111, a survey/questionnaire 112, a database crawler 113, an image portal 114, and an interactive chatbot 115. Data obtained via these mechanisms may be further processed by one or more data processing pipelines 116 which may format and process the obtained data for further use by system 100 such as for training one or more machine and deep learning algorithms or to be used as input into data analysis and recommendation engine 160 in order to generate as output individualized beauty product recommendations.

A data connector 111 may be used to expose existing application programming interfaces (APIs) for external services or data sources to facilitate data gathering and extraction. For example, an intended user can choose to link a social media account with their individual profile 120 and the data connector 111 can find and interact with APIs that allow for social media data (e.g., likes, dislikes, comments, photographs, etc.) to be retrieved and added to the intended user's individual profile. Web/database crawler 113 may be configured to search for and download, from the internet, medical information materials related to beauty, hygiene, and health products, including, but not limited to, archives of published medical literature such as MEDLINE and PubMed, archives of clinical trial databases, news reports, conference papers, and individual journals. Additionally, web/database crawler 113 may be configured to search for and download ingredient lists of a plurality of beauty, hygiene, and health products. As the medical information and ingredient information is downloaded, it is fed to data processing pipeline(s) 116 which may perform a series of operations to extract data from the medical information materials and ingredient information. For example, data processing pipeline(s) 116 may first determine a format of each of the materials received (e.g., text, PDFs, images), and perform conversions of materials not in a machine readable or extractable format (e.g., performing optical character recognition (OCR) on PDFs and images to extract any text contained therein).

According to an embodiment, an intended user may complete one or more survey/questionnaire 112 which may be configured to extract a plurality of user information related to facts, concerns, preferences, and goals in regard to the intended user's beauty, hygiene, and health. In a preferred embodiment, an intended user completes one or more questionnaires during system registration such that the intended user's individual profile 120 may be populated with useful and relevant user-submitted data which can be used as input into data analysis and recommendation engine 160. Questionnaires 112 may be used to gather user information after the creation of an individual profile 120. In some embodiments an interactive chatbot 115 may be configured to converse with system users in order to extract useful and relevant user data for individual profile 120 creation or to gather supplemental user information. Chatbot 115 may also be configured to provide customer service and serve relevant content. According to a preferred embodiment, an image portal 114 may be configured to receive a user-uploaded photograph of the user. Image portal 114 may automatically validate the photograph for color accuracy, quality, and other properties. User-uploaded photos may be full body length photos or head shot photos. If a full body length photo is uploaded, image portal 114 may be configured to crop the photo such that only the user's head is within the frame of the image. Furthermore, image portal may create a copy of the user-uploaded or cropped image so that one or more image processing and analysis tasks may be performed on the copy of the image. Image processing and analysis may be performed by a skin analysis engine 130. User-uploaded photograph(s) and cropped images may be added to the user's individual profile 120 and stored in user database(s) 140.

System user information may include, but is not limited to, age, gender, physical address and/or other user location description (e.g., a zip code or geographical region, billing information, etc.), email address, social media handle or username, purchase history, shopping cart inventory data, webpage views, online interactions, user product or service reviews, user recommendation system reviews, social media data (e.g., likes, dislikes, mentions, product and/or company subscriptions, etc.), fact-based input data (e.g., hair type, hair porosity, hair texture, skin type, dark spots, acne, hyperpigmentation, allergies, beauty routine, beauty product preference(s), etc.), a user-uploaded photograph, concern-based input, data (e.g., line lines and wrinkles, loss of skin elasticity, thinning hair, damaged ham, sun damage to skin, etc.), preference-based input, and goal-based input data (e.g., radiant and youthful, thermal protection hair, volumize hair, etc.).

According to an embodiment, user data may be obtained using both explicit and implicit forms of data collection, Examples of explicit data collection include, but are not limited to, asking an intended user to rate an item on a sliding scale, asking an intended user to search, asking an intended user to rank a collection of items from favorite to least favorite, presenting two items to an intended user and asking her/him to choose the better one of them, asking an intended user to create a list of items that she/he likes. This type of explicit data may be gathered during intended user profile creation and registration, it may be gathered via a series of questionnaires 112 that the intended user can submit, it may be gathered from an interactive chat-bot 115 that can converse with an intended user to extract user preference data, and it may be gathered from external sources such as a user-linked social media account or geographic and mapping services such as GOOGLE MAPS®. These data gathering techniques are used as examples and do not represent all possible data gathering techniques which may be used in various embodiments of the disclosed system. Examples of implicit data collection include, but are not limited to, observing the items that an intended user views in an online store, analyzing item/user viewing times, keeping a record of the items that a user purchases online, obtaining a list of items that a user has searched for or purchased on her/his computer or mobile computing device (e.g., smart phone, tablet, laptop, smart wearable, etc.), analyzing the user's social network and discovering similar likes and dislikes.

The gathered user information can be used to create an individual profile 120 of the user and can be stored in user database(s) 140. The gathered product information may be stored in product databases) 150. Both the user databases) 140 and product database(s) 150 may be implemented on any suitable storage device including, but not limited to, external or internal hard drives and solid state drives, flash memory, cloud storage, ROM, RAM, and other non-transitory storage mediums. Both user database(s) 140 and product database(s) 150 may be configured to store data in a plurality of ways such as in a relational database, graph database, object-oriented database, NoSQL, database, centralized database, cloud database, operational database and the like.

The one or more product databases 150 may be configured to include relevant information concerning beauty products, such as to facilitate matching of products with individuals. Product database(s) 150 may include detailed product information, such as the non limiting examples of ingredients, functions of the ingredients, allergens, sourcing information (e.g., fair trade, ethically sourced, etc.), benefits, use, ingredient free data and the like. According to an embodiment, product information may be vectorized such that each product in the product database(s) 150 has a unique vector representation. The vectorized products may be stored in product database(s) 150.

According to an embodiment, data analysis and recommendation engine 160 may receive as inputs an individual profile, one or more skin analysis outputs, and product data in order to generate as output one or more personalized beauty product recommendations to an end user device 170. Recommendation engine 160 may use the input response by the user from the individual profile 120 to automatically create a mapping 161 of user information to product requirements. Environmental conditions may be extracted for personalized recommendations by using the locational input provided by the user in the individual profile 120. Environmental context is important for making beauty product recommendations. Environmental factors such as air quality, UV index, water quality (e.g., soft or hard water), temperate zone, and climate. For example, water quality is an important factor when recommending beauty products because if the product utilizes a surfactant cleansing function there will not be much lather in hard water areas and as a result those types of products with be less effective. Using all user information and the environmental factors a requirement vector is created 162. All available products may be represented by a vector and a similarity score of products may be calculated between all product vectors and the requirement vector using similarity calculator 164. The similarity score may be calculated by a variety of methods such as cosine similarity and/or Euclidian distance and/or other similarity metrics known to those skilled in the art. The 3-4 top products with the highest similarity score in different product categories can be presented to the customer on the end user device 170 as personalized recommendations. In this way, system 100 can match customer requirements to products. For example, a customer may have indicated that he is concerned about clogged pores and prefers organic products, and the recommendation engine 160 can differentiate between products that have chemical ingredients versus organic ingredients and would recommend to the customer a product with organic ingredients that can alleviate clogged pores.

Recommendation engine 160 utilizes the information, gathered, organized, and stored by data extraction engine 110 to train machine and deep learning algorithms at a training stage and conduct analyses in response to user activity and return recommendations based on the analyses at an analysis stage. According to an embodiment, recommendation engine 160 may utilize one or more neural networks 163 in order to predict recommended products for the system user. Examples of neural networks that may be used include, but are not limited to, recurrent neural networks (RNNs), long shot-term memory (LSTM) networks, and graph based neural networks (GNNs). The neural network 163 may be trained on a subset of the product database(s) 150 data and a subset of the user database(s) 140 data. Product vectors and requirement vectors may be created from the subsets) of data and fed into the input layer of the neural network 163. The vector representations are processed by the hidden layers for feature extraction. The output layer produces the result to recommend a product. During the training process neural network 163 may be optimized by tuning the hyperparameters for each layer of the network, as well as using backpropagation and gradient descent techniques to minimize the error between layers and improve network predictions. At the output, the trained model should produce one or more recommended products for a one or more product categories. The outputted recommended products may be in vector form. A similarity score may be calculated between the outputted product vectors and the requirement vector. The product(s) with the highest similarity score may be displayed to the customer as recommended products.

According to an embodiment, recommendation engine 160 may use content-based filtering, collaborative filtering, session-based filtering, or a hybrid combination of these. Initially, recommendation engine 160 may implement content-based filtering which is based on a description of the item (e.g., product vector) and an individual profile of the user's preferences.

The data contained in the individual profile 120 can be matched with suitable products from product database(s) 150 by recommendation engine 160. In making recommendations, recommendation engine 160 considers the inputs from the fact-based information, the concern-based information, the preference-based information, and the goal-based information. For example, in the event, the individual profile 120 indicates the presence of oily skin, acne, scarring, homes in a tropical climate and prefers gluten free products, the recommendation engine 160 via the neural network 163 match the individual with appropriate cleansers with salicylic acid to address acne, toner with aloe for calming and soothing properties, lightweight moisturizer with sunscreen to reflect the tropical climate and includes salicylic acid for acne, with all product recommendations being gluten free. In this example, it should be appreciated that recommendation engine 160 is configured to match the individual with complimentary products for specific conditions, such as the acne condition.

According to an embodiment, recommendation engine 160 may have, the form of a rule-based recommendation engine, with supervised learning. Recommendation engine 160 considers the individual's conditions, concerns, goals, and environmental conditions, as well as past purchases. Additionally, recommendation engine 160 may be configured to also consider the recommendations made to individuals having similar profiles. In other embodiments, recommendation engine 160 may have other forms and can consider other decision-making criteria.

As a user develops experience with the products listed in the individual beauty product recommendations, feedback information can be entered into the individual profile 120 via the end user device 170. The feedback information can include, but is not limited to, experiences with certain products and/or ingredients, likes and dislikes. The feedback information may be used to adapt time individual profile 120 to those products which better suit the individual's needs. In this way, system 100 advantageously learns and adjusts to the specific needs, concerns, and goals of an individual based on sentiment (e.g., reviews), lookalike audiences, wish-listed items, searches and the like.

Figure 2:
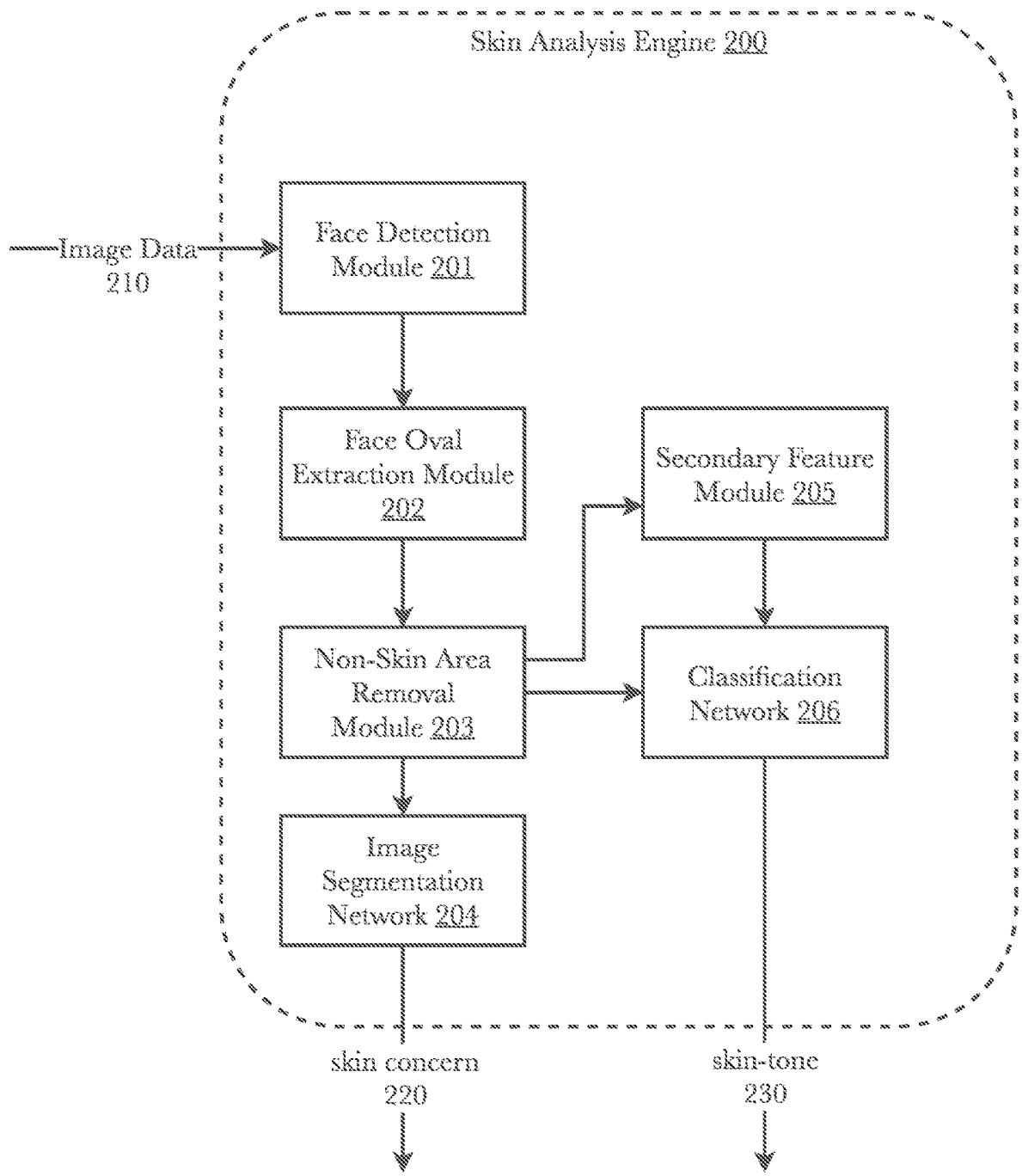
FIG. 2 is a block diagram illustrating an exemplary architecture for an aspect of the personalized beauty product recommendation system, a skin analysis engine.

FIG. 2 is a block diagram illustrating an exemplary architecture for an aspect of the personalized beauty product recommendation system 100, a skin analysis engine 200. According to an embodiment, the skin analysis engine 200 may comprise a face detection module 201, a face oval extraction module 202, a non-skin area removal module 203, a secondary feature module 205, one or more classification networks 206, and one or more image segmentation networks 204. It should be appreciated that various embodiments may include more or less modules without deviating from the scope and function of the disclosed system. The various modules and networks operating within skin analysis engine 200 may comprise one or more machine and deep learning algorithms. These algorithms may be trained using a subset of the information located in user database(s) 140, product database(s) 150, and external data that may be obtained. The training of these algorithms may be conducted via supervised learning, unsupervised learning, or some combination of the two.

According to an embodiment, when a system 100 user uploads a photograph it may trigger skin analysis engine 200 to receive, retrieve, or otherwise obtain the uploaded image data 210 in order to perform skin analysis. The face detection module 201 analyzes the image data and detects the face of the user. Additionally, face detection module 201 can detect ethnic facial types. Upon detection of the user's face, the image is cropped and fed into a face oval extraction module 202 that extracts the face oval of user in the uploaded image. The face oval can be used to determine the face shape of the user. The non-skin area removal module 203 may be used to remove non-skin areas from the face (e.g., eyebrows, eyes, lips, etc.). After the image data 210 has been processed through these modules, what remains is a processed image of the user's face without its facial features. The processed image may then be sent to either of or both of a classification network 206 to determine the skin-tone of the user and an image segmentation network 204 that detects and classifies the skin concerns of the user. Both skin-tone analysis 230 and skin concern analysis 220 outputs may be used to match cosmetic products to a user, such as matching foundation to skin tone or recommending products that may alleviate a user's skin concern.

Image segmentation is the process of dividing an image into multiple segments. In this process, every pixel in the image is associated with an object type. There are two major types of image segmentation: semantic segmentation and instance segmentation. In semantic segmentation, all object of the same type are marked using one class label while in instance segmentation similar object get their own separate labels. The basic architecture in image segmentation consists of an encoder and decoder. Then encoder extracts features from the image through filters. The decoder is responsible for generating the final output which is usually a segmentation mask containing the outline of the object.

According to an embodiment, image segmentation network 204 may comprise a convolutional neural network (CNN) with a trained encoder and decoder. There are a variety of CNN architectures known in the art that may be used for image segmentation such as, for example, U-Net, Fast Fully-connected network (FastFCN), Gated-Stream CNN, DeepLab, and Mask R-CNN to name a few. An encoder may be trained to extract features corresponding to a pre-determined set of skin concern objects. For example, skin concern objects may include, but are not limited to, acne, hyperpigmentation, scarring, ultraviolet (UV) damage, melasma, itchy scalp, etc. The encoder can be trained to extract features and detect one or more skin concern objects that may be present in the processed image in order to classify user skin concerns such that the system 100 may make personalized recommendations. For example, image segmentation network 204 could detect whether a user has hyperpigmentation or melasma, which are different skin conditions and thus require different products to treat the conditions and which would be taken into account when analyzing the image and making product recommendations. The encoder may be trained on a subset of the uploaded images to system 100. Additionally, the encoder may be trained using supervised learning and a large corpus of labeled images which show a skin condition. Such labeled images may be gathered from publicly available databases, datasets, and medical literature. The encoder may extract features from the image through one or more filters. The decoder is responsible for generating the final output which can be a segmentation mask containing the outline of the skin concern object(s). The outlined skin concern objects may then be used to classify the user skin concerns. The classified skin concerns 220 may then be used as an input to data analysis and recommendation engine 160 for generating personalized beauty product recommendations.

According to an embodiment, classification network 206 may comprise a convolutional neural network with a trained encoder and decoder. A CNN is able to successfully capture the spatial and temporal dependencies in an image though the application of relevant filters. A CNN performs a better fitting to the image dataset due to the reduction in the number of parameters involved and reusability of weights. In other words, the CNN can be trained to understand the sophistication of the image better. The role of the CNN is to reduce the images into a form which is easier to process, without losing features which are critical for generating good predictions. Classification network 206 may comprise a plurality of convolutional layers/filters which taken together form the encoder part of the network. For example, a first filter is called the Kernel which moves across the input image with a certain stride value (the number of pixels the Kernel filter moves at a time) until the entire image is traversed. In the case of images with multiple channels (e.g., RGB), the Kernel has the same depth as that of the input image. Matrix multiplication may be performed between the Kernel filter matrix and the input channel stack and all the results can be summed with the bias to generate a compact one-depth channel convoluted feature output. The purpose of the convolution operation is to extract the high-level features such as edges, from the input image 210. Generally, the first convolution layer is responsible for capturing the low-level features such as edges, color, gradient orientation, etc. With additional layers, the CNN adapts to high-level features as well, giving classification network 206 a complete understanding of the images in the dataset.

Similar to the convolutional layer, the pooling layer is responsible for reducing the spatial size of the convolved feature. This is done to decrease the computational power required to process the data through dimensionality reduction. Furthermore, it is useful for extracting dominant features which are rotational and positional invariant, thus maintaining the process of effectively training the classification model. Pooling layers may be implemented between convolution layers of the CNN with the goal of this type of architecture being a spatially reduced, feature-rich representation of the input image 210. There are two main types of pooling known in the art: max pooling and average pooling. Depending on the embodiment, either max pooling or average pooling may be implemented in classification network 206. Max pooling also performs as a noise suppressant; it discards the noisy activations altogether and also performs de-noising along with dimensionality reduction. As a result, in a preferred embodiment of the system 100 max pooling may be implemented as it leads to improved model performance compared to average pooling.

The convolutional layer and the pooling layer together form the i-th layer of the CNN. Depending on the complexities in the images, the number of such layers may be increased for capturing low-level details even further. After going through the above process, the classification network 206 is enabled to understand the features and results in a fully trained encoder portion of the CNN. Classification network 206 may then flatten the final output of the encoder and feed it to a regular neural network for classification purposes. Adding a fully connected layer to the output of the CNN can allow for learning of non-linear combinations of the high-level features as represented by the output of the convolutional layer(s). The fully-connected layer is learning a possible non-linear function in that space. After passing through the CNN the input image is converted into a suitable form for input into a multi-level perceptron neural network, the classification network 206 may flatten the image into a column vector. The flattened output may be fed to a feed forward neural network and backpropagation may be applied to every iteration of training. Over a series of epochs, the model is able to distinguish between dominating and certain low-level features in images and classify them using a soft-max classification technique. In other embodiments, different classification techniques known in the art may be used. As a result of the above process, one or more classification networks 206 may be trained and configured to classify input images 210 such as for skin-tone analysis, skin concern analysis and various other skin related tasks. The outputted skin-tone 230 may be sent to data analysis and recommendation engine 160 and used as an input to generate personalized beauty product recommendations.

Figure 10:
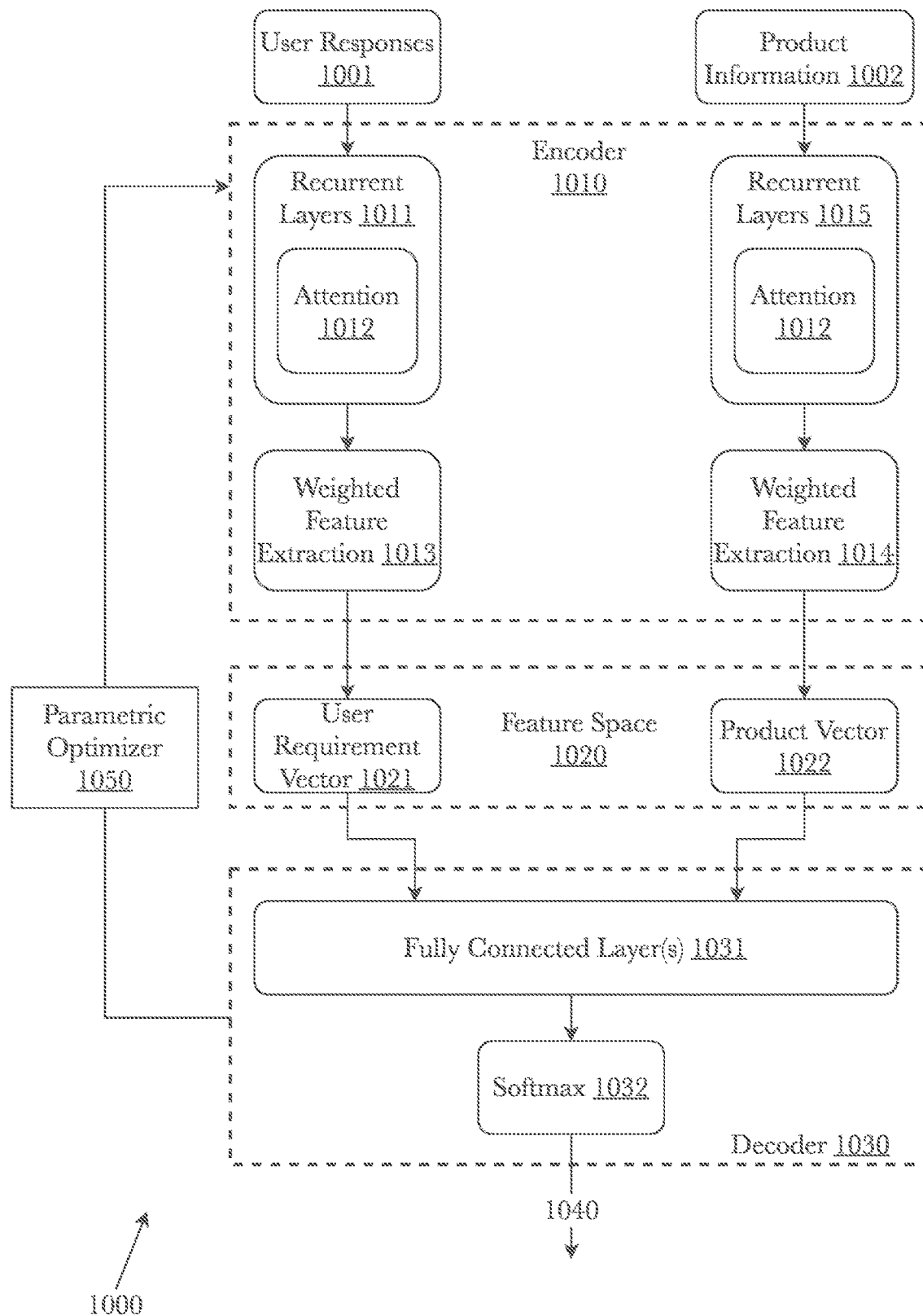
FIG. 10 is a block diagram illustrating an exemplary architecture for the training of a beauty product recurrent neural network, according to an embodiment.

FIG. 10 is a block diagram illustrating an exemplary architecture for the training of a beauty product recurrent neural network 1000, according to an embodiment. According to an embodiment, a recurrent neural network may be trained and utilized to generate personalized beauty product recommendations. The training of the beauty product RNN 1000 may be implemented using supervised learning techniques. The beauty product RNN 1000 may be trained using a subset of the obtained and pre-processed user responses 1001 and product information 1002. User responses 1001 may include fact-based inputs, concern-based inputs, preference-based inputs, and goal-based inputs as well as locational data extracted from the fact-based inputs. The subset of user responses 1001 may be fed into an encoder 1010 which may have one or more recurrent layers 1011 for embedding the input subset of user responses 1001 such that after the input data has been processed through the one or more recurrent layers the encoder 1010 may extract the input data's defining features and assign weights 1013 to the neurons existing within the hidden recurrent layers 1011. After passing the subset of user responses 1001 through encoder 1010, what is output is a user requirement vector 1021 existing within the encoded feature space 1020. The user requirement vector 1021 may comprise all of a given user's responses 1001 and environmental context extracted from locational data encoded into the requirement vector 1021 after passing through the one or more recurrent layers 1011. According to some embodiments, beauty product RNN 1000 may be configured with one or more attention 1012 mechanisms. Attention 1012 is a mechanism that may be combined with the beauty product RNN 1000 allowing it to focus on certain parts of the input when predicting a certain part of the output sequence, enabling easier learning and of higher quality.

The subset of product information 1002 may be fed into an encoder 1010 which may have one or more recurrent layers 1015 for embedding the input subset of product information 1002 such that after the input data has been processed through the one or more recurrent layers the encoder 1010 may extract the input data's defining features and assign weights 1014 to the neurons existing within the hidden recurrent layers 1015. After passing the subset of product information 1001 through encoder 1010, what is output is a product vector 1022 existing within the encoded feature space 1020. According to some embodiments, beauty product RNN 1000 may be configured with one or more attention 1012 mechanisms. Attention 1012 is a mechanism that may be combined with the beauty product RNN 1000 allowing it to focus on certain parts of the input when predicting a certain part of the output sequence, enabling easier learning and of higher quality.

Both the user requirement vector 1021 and product vector 1022 may be sent to the decoder 1030 where the vectors may be processed through one or more fully connected layers 1031 which may be configured to extract one or more products from the feature space 1020 which are similar or exist within proximity to the user requirement vector 1021 within the feature space 1020. A SoftMax layer 1032 may be configured to assign probabilities to the extracted products which measure the appropriateness of the extracted beauty products to satisfy the user requirement vector 1021. The SoftMax layer 1032 may connect to an output layer which generates as outputs one or more personalized beauty product recommendations 1040. At this point in the training process the beauty product RNN can be evaluated for model performance and feedback training using a parametric optimizer 1050. Parametric optimizer 1050 may be configured to allow for hyperparameter tuning and neuron weight adjustment. Hyperparameters that may be configured and adjusted between training sessions include, but are not limited to, the number of hidden layers and units, dropout (e.g., to avoid overfitting the model thus increasing the generalization power), network weight in initialization, the activation function (e.g., SoftMax, sigmoid, rectifier activation function, etc.), the learning rate (i.e., how quickly the network updates its parameters), momentum, number of epochs, batch size and the like. Parametric optimizer 1050 may utilize various methods to discover and tune hyperparameters such as manual search, grid search, random search, and Bayesian optimization. Beauty product RNN 1000 optimization and training may be conducted numerous times until model performance and accuracy have met a predetermined criteria for model performance.

After beauty product RNN 1000 has been fully trained, it may be implemented by system 100 in order to generate personalized beauty product recommendations using user response data as input. After deployment and as new users and products are introduced to system 100, beauty product RNN 1000 may continuously optimize and update model parameters using user feedback to adjust hyperparameters and network weights.

According to an embodiment, the recurrent layers 1011, 1015 may be replaced by long short term memory (LSTM) cells which are a type of recurrent neural network with built in memory which may increase the model performance and improve beauty product recommendations.

Detailed Description of Exemplary Aspects

Figure 3:
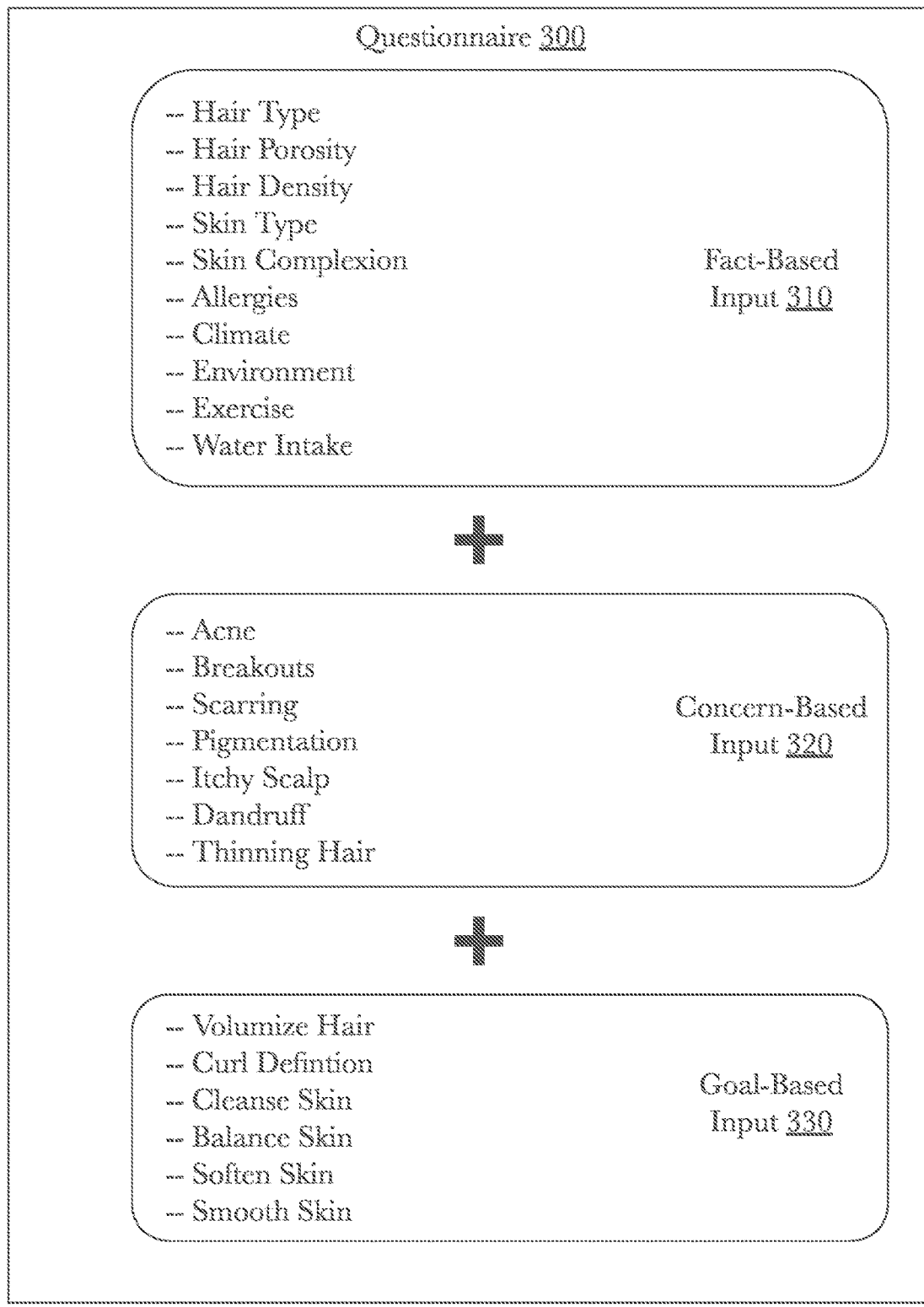
FIG. 3 is a block diagram illustrating an exemplary questionnaire that may be used for gathering user information, preferences, concerns, and goals for the creation of a user's individual profile for matching individuals with beauty product recommendations, according to an embodiment.

FIG. 3 is a block diagram illustrating an exemplary questionnaire 300 that may be used for gathering user information, preferences, concerns, and goals for the creation of a user's individual profile for matching individuals with beauty product recommendations, according to an embodiment. According to an embodiment, a questionnaire 300 may be configured for a plurality of functions. As a first function, the questionnaire 300 may be configured to develop a physical profile of the intended user. The physical profile of the intended user may be developed through the use of fact-based inputs 310. For example, fact-based inputs 310 may include, but are not limited to, hair type, hair porosity, hair density, skin type, skin complexion, allergies and the like. The fact-based inputs 310 can also include environmental inputs such as the non-limiting examples of climate and altitude. The fact-based inputs 310 may also include lifestyle factors such as the non-limiting examples of exercise and water intake. In this way, questionnaire 300 can be used to gather and collate user information in order to produce a physical profile of an intended user that can be used as one form of input into a data analysis and recommendation engine 160 to produce as output individualized beauty product recommendations.

The questionnaire 300 may also be configured to develop a profile of concerns that the intended user may have. The concern profile of the intended user can be developed through the use of concern-based inputs 320. For example, concern-based inputs 320 may include, but are not limited to, acne, acne breakouts, scarring, pigmentation, itchy scalp, dandruff, thinning hair and the like.

The questionnaire 300 may also be configured to develop a profile of preferences that the intended user may have regarding health and beauty products. The preference profile of the intended user can be developed through the use of preference-based inputs. For example, preference-based inputs may include, but are not limited to: prefers ethically sourced products (e.g., fair trade, organic, small batch, animal cruelty free, etc.); ingredient preferences (e.g., prefers gluten free products despite not having a gluten allergy), shipping and delivery preferences, health and beauty product preferences (e.g., prefers a face mask product over a face cream product, and various other types of preferences that cannot be captured via the fact-based inputs 310, the concern-based inputs 320, and the goal-based inputs 330.

The questionnaire 300 may be further configured to develop a goal profile of the intended user, that is, what goals and expectations does the user have with regard to beauty products. The goal profile of the intended user may be developed through the use of goal-based inputs 330. For example, goal-based inputs may include, but are not limited to, volumizing hair, curl definition, cleansing and balancing skin, softening and smoothing skin and the like.

While the questionnaire 300 illustrated in FIG. 3 includes fact-based inputs 310, concern-based inputs 320, and goal-based inputs 330, it should be appreciated that in other embodiments questionnaire 300 may include more or less inputs. For example, other inputs may include user preferences such as the non-limiting examples of paraben free products, sodium lauryl sulfate free products and the like. Other non-limiting examples of other inputs can include medical-related conditions such as, for example, pregnancy and menopause. Taken together, the fact-based input 310 responses, the concern-based input 320 responses, the preference-based inputs responses, and the goal-based input 330 responses may be used to create and populate an individual profile of an intended user. The user-submitted responses may be used to generate a requirement vector that can be processed by recommendation engine 160 to generate as output personalized beauty product recommendations.

Figure 4:
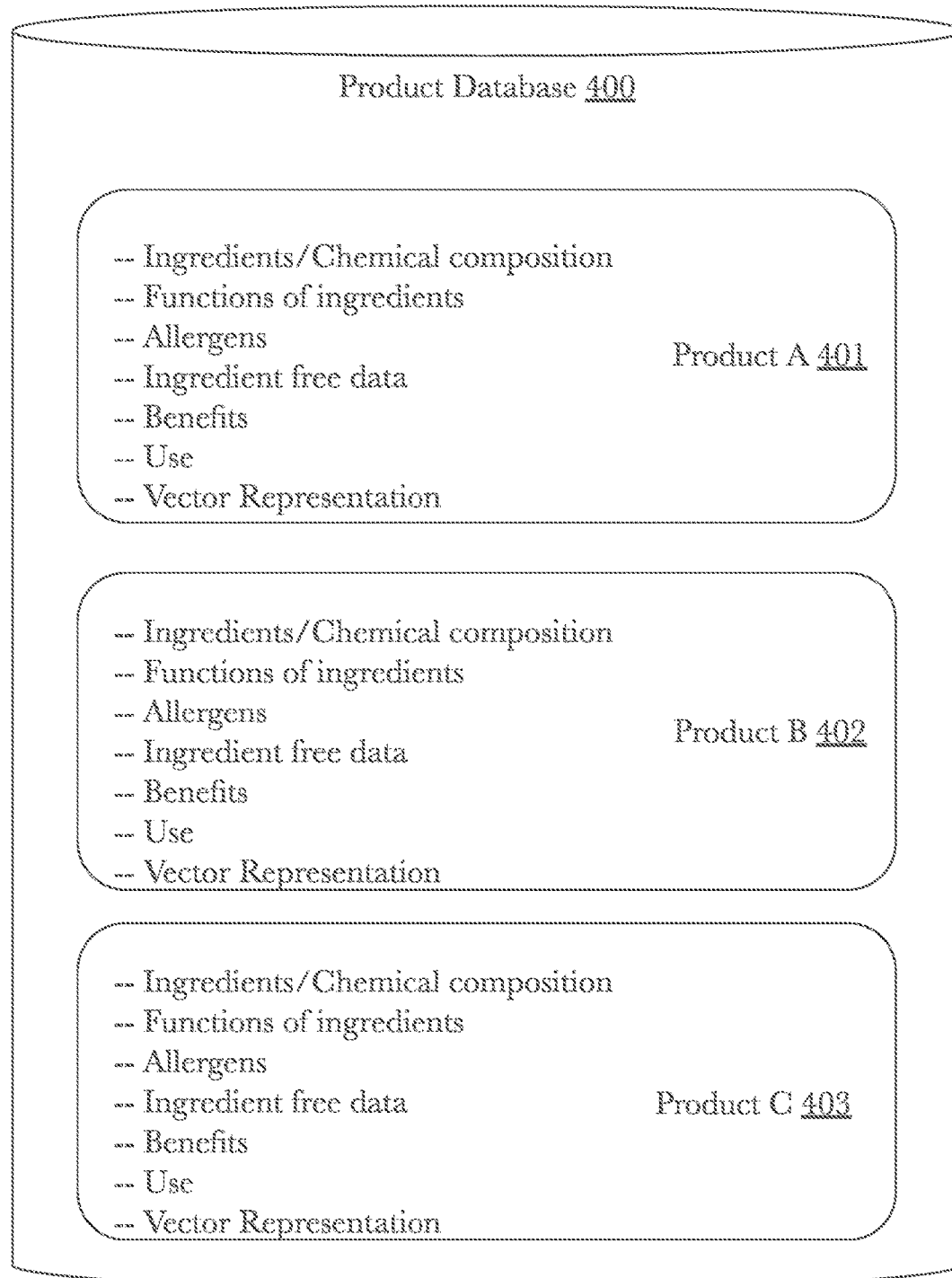
FIG. 4 is a diagram illustrating an exemplary product database, according to an embodiment.

FIG. 4 is a diagram illustrating an exemplary product database 400, according to an embodiment. According to an embodiment, product database 400 may be configured to include relevant information concerning beauty, hygiene, and health products, such as to facilitate matching products with individuals. Product database 400 can include detailed product information, such as the non-limiting examples of ingredients, functions of the ingredients, allergens, ingredient free data and the like. Additionally, each product may have a vector representation of the product details stored in the product database 400. In this figure, product A 401 is shown, product B 402 is shown, and product C 403 is shown. However, in other embodiments, the product database 400 can include more or less products, more or less detailed product information and the product information can be presented in other formats.

FIG. 5 is a diagram illustrating an exemplary recommended product list, according to an embodiment. According to an embodiment, the individual beauty product recommendations 500 can include information concerning hair-related products 510 and skin-related products 520. While not illustrated, individual beauty product recommendations 500 can also include recommended makeup-related products, lipstick-related products, eye-related products, products to remove make-up, scent-related products and the like. Individual beauty product recommendations 500 may be displayed to a customer on an end-user device 170 such as a desktop or laptop computer, smart phone, tablet, smart wearable and other compute devices. A customer may be able to view the product recommendations 500 and then choose to add the items to an online shopping cart, or purchase the recommended products 500.

Figure 6:
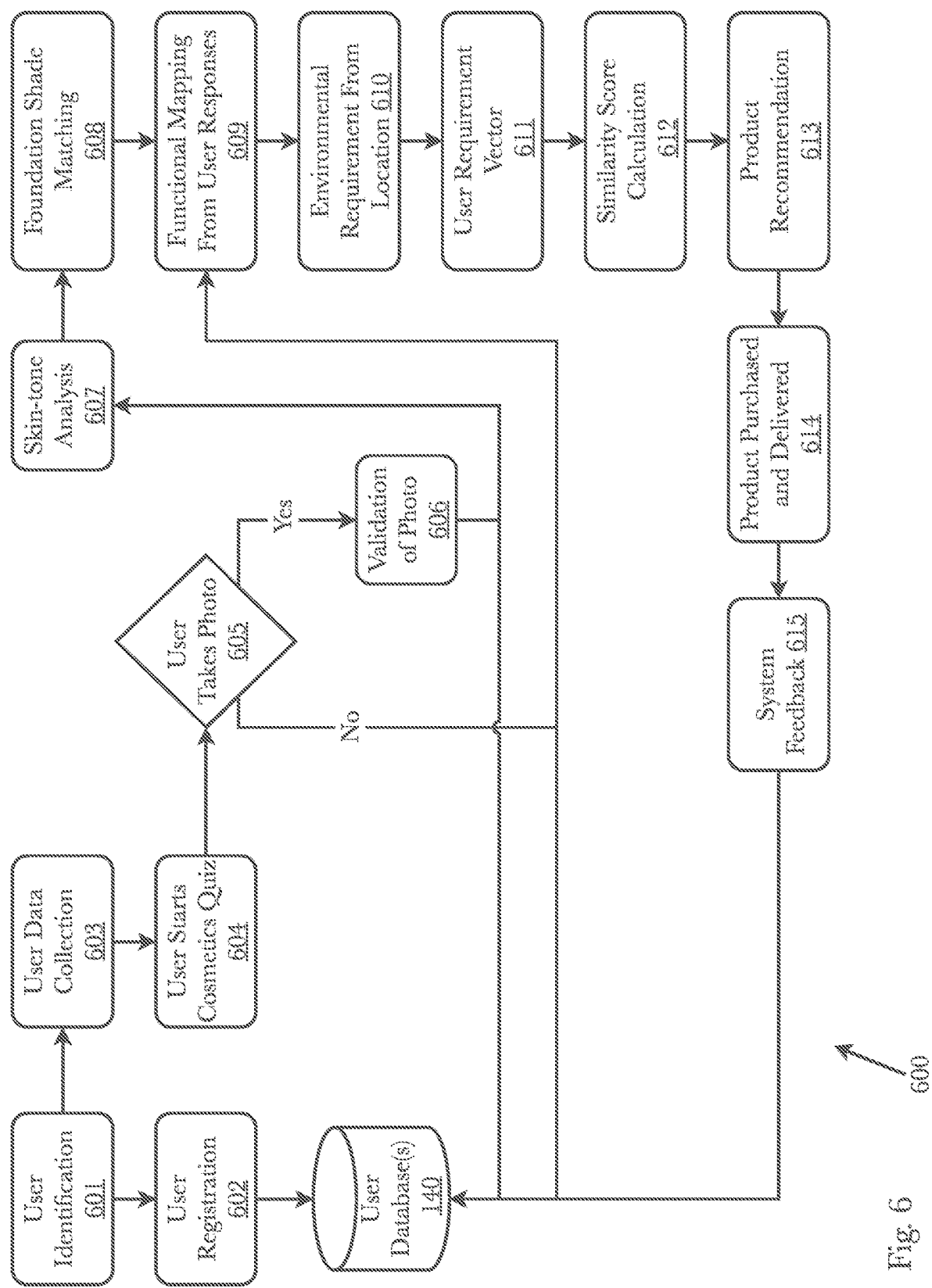
FIG. 6 is a flow diagram illustrating an exemplary method for generating individualized beauty product recommendations utilizing a quiz and skin-tone analysis, according to an embodiment.

FIG. 6 is a flow diagram illustrating an exemplary method 600 for generating individualized beauty product recommendations utilizing a quiz and skin-tone analysis, according to an embodiment. According to an embodiment, the process begins by identifying the user 601 using, for example, a username and password that provides access to the system 100. In the case that the user has not previously used the system, the user can proceed to registration to set up a new account 602. The user's information and details (e,g., name, address, etc.) can then be stored in user database 140. Once the user is identified by the system (e.g., logged in), data can be collected 603 to determine the user's needs (e.g., allow the system to store all quiz/questionnaire responses, allow the user to store images, etc.). The data collection step can be performed by users themselves by taking the quiz (and/or answering the questionnaire and/or conversing with a chatbot) or photographs on a consumer device (e,g., a laptop, desktop, mobile phone, tablet computer, smart wearables, etc.) 604, 605 which will then automatically validate the photograph for color accuracy, quality, and other properties 606. Information captured by the quiz (or questionnaire or chatbot) or the device can be stored in the user database(s) 140 for later reference and reuse.

If a user uploads a photograph of themselves, the skin-tone analysis algorithm(s) are triggered 607. For more detailed information about the skin-tone analysis 607 process, please refer to FIG. 7. The output of the skin-tone analysis may be taken as input in creating personalized recommendations for foundation shade 608. If a user does not upload a photograph of themselves, then the skin-tone analysis 607 step is bypassed and the process proceeds to step 609. The data analysis and recommendation engine 160 may use the input response (e.g., quiz/questionnaire responses) by the user to create a mapping of the requirements 609. The environmental conditions may be extracted for personalized recommendation by using the locational input provided by the user 610. Using all user responses and the environmental factors a requirement vector may be created 611. All available products are represented as vectors and a similarity score of all products may be calculated 612 using the requirement vector. The top product or products with the highest similarity score in different product categories may then be presented (e.g., displayed on a webpage) to the customer system user) as a product recommendation 613. A customer may then proceed to purchase the product and have it delivered 614. The delivered product and any customer feedback may be stored in the user database(s) 140 and used for recalibration 615 of the one or more machine and deep learning algorithms and/or models.

Figure 7:
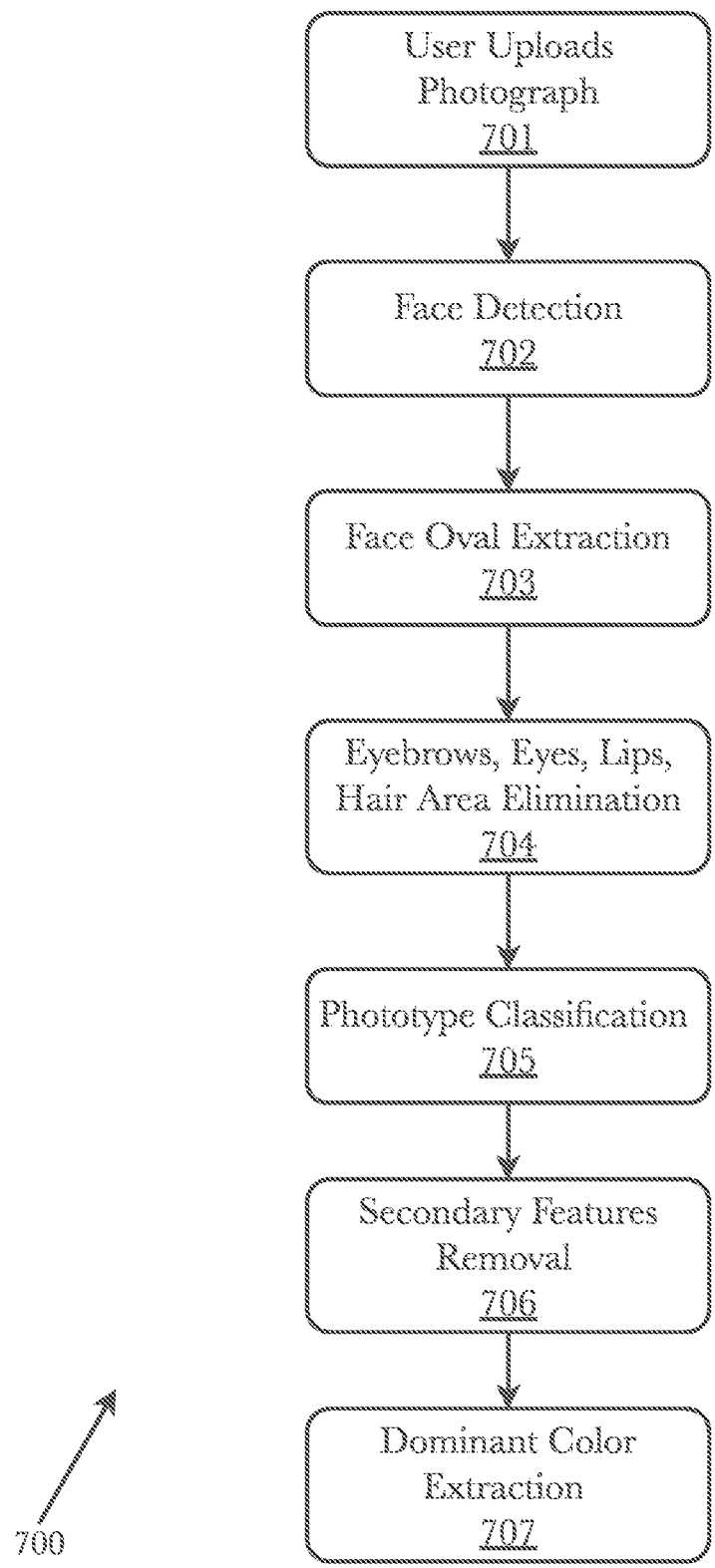
FIG. 7 is a flow diagram illustrating an exemplary method for conducting skin-tone analysis on a user-submitted photograph, according to an embodiment.

FIG. 7 is a flow diagram illustrating an exemplary method 700 for conducting skin-tone analysis on a user-submitted photograph, according to an embodiment. According to an embodiment, skin-tone analysis is triggered when a user uploads a photograph 701 and may be implemented by skin analysis engine 130. Skin analysis engine 130 detects the face 702 of the user. In a next step, the image may be cropped and analyzed to extract the face oval 703 of the user. At the next step, non-skin areas from the face are removed 704 (e.g., eyebrows, eyes, lips, etc.). At the next step, the image with the eliminated non-skin areas may be used as input into a classification network that detects the skin tone 705. Then secondary features such as a beard, bindi, and jewelry are removed if detected 706. As a last step, the dominant skin tones are extracted and output as skin-tone color 707. The output skin-tone may then be used as an input to data processing and recommendation engine 160 for creating personalized beauty product recommendations.

Figure 8:
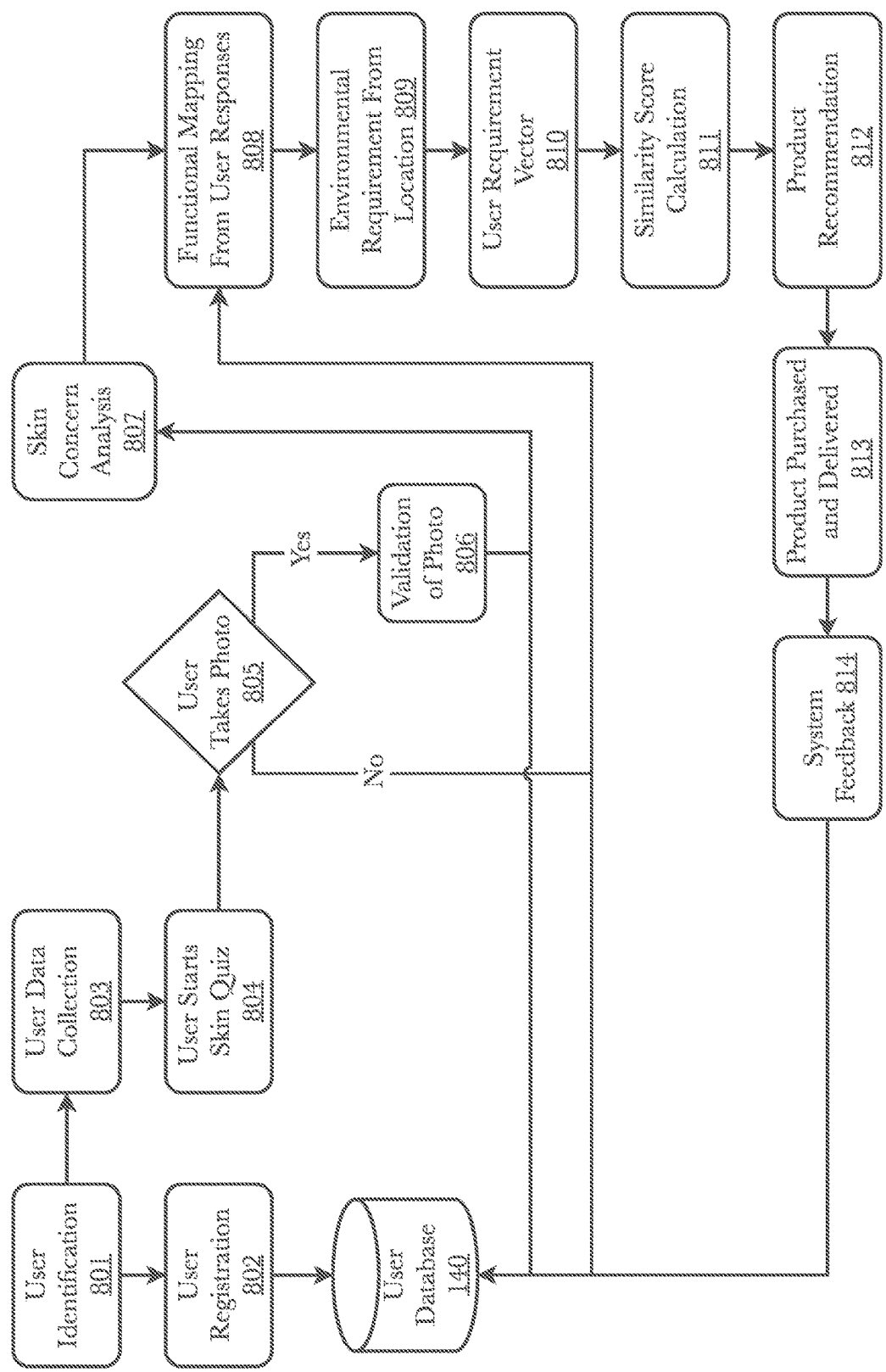
FIG. 8 is a flow diagram illustrating an exemplary method for generating individualized beauty product recommendations utilizing a quiz and skin concern analysis, according to an embodiment.

FIG. 8 is a flow diagram illustrating an exemplary method 800 for generating individualized beauty product recommendations utilizing a quiz and skin concern analysis, according to an embodiment. According to an embodiment, the process begins by identifying the user 801 using, for example, a username and password that provides access to the system 100. In the case that the user has not previously used the system, the user can proceed to registration to set up a new account 802. The user's information and details (e.g., name, address, etc.) can then be stored in user database 140. Once the user is identified by the system (e.g., logged in), data can be collected 803 to determine the user's needs (e.g., allow the system to store all quiz/questionnaire responses, allow the user to store images, etc.). The data collection step can be performed by users themselves by taking the quiz (and/or answering the questionnaire and/or conversing with a chatbot) or photographs on a consumer device (e.g., a laptop, desktop, mobile phone, tablet computer, smart wearables, etc.) 804, 805 which will then automatically validate the photograph for color accuracy, quality, and other properties 806. Information captured by the quiz (or questionnaire or chatbot) or the device can be stored in the user database(s) 140 for later reference and reuse.

If a user uploads a photograph of themselves, the skin-concern analysis algorithm(s) are triggered 807. For more detailed information about the skin-concern analysis 807 process, please refer to FIG. 9. The output of the shin-concern analysis may be taken as input in creating personalized recommendations. The data analysis and recommendation engine 160 may use the input response (e.g., quiz/questionnaire responses) by the user to create a mapping of the requirements 808. The environmental conditions may be extracted for personalized recommendations by using the locational input provided by the user 809. Using all user responses and the environmental factors, a requirement vector may be created 810. All available products are represented as vectors and a similarity score of all products may be calculated 811 using the requirement vector. The top product or products with the highest similarity score in different product categories may then be presented (e.g., displayed on a webpage) to the customer (i.e., system user) as a product recommendation 812. A customer may then proceed to purchase the product and have it delivered 813. The delivered product and any customer feedback may be stored in the user database(s) 140 and used for recalibration 814 of the one or more machine and deep learning algorithms and/or models.

Figure 9:
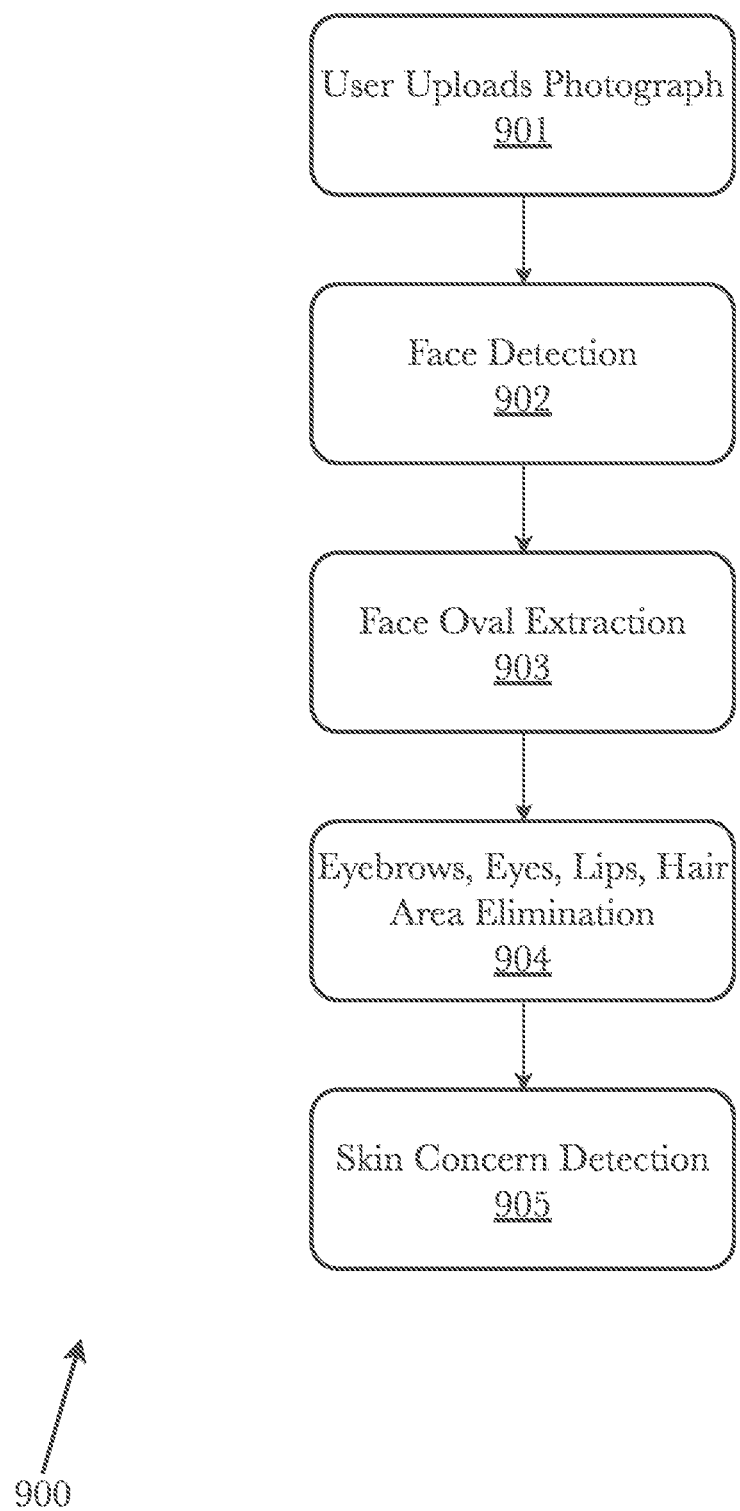
FIG. 9 is a flow diagram illustrating an exemplary method for conducing skin concern analysis on a user-submitted photograph, according to an embodiment

FIG. 9 is a flow diagram illustrating an exemplary method 900 for conducting skin concern analysis on a user-submitted photograph, according to an embodiment. According to an embodiment, skin concern analysis may be triggered when a user-uploads a photograph 901 and may be implemented by skin analysis engine 130. Skin analysis engine 130 detects the face 902 of the user. In a next step, the image may be cropped and analyzed to extract the face oval 903 of the user. At the next step, non-skin areas from the face are removed 904 (e.g., eyebrows, eyes, lips, etc.). At the next step, the image with the eliminated non-skin areas may be used as input into an image segmentation network that detects and classifies the skin concerns 905. The output skin concerns may then be used as an input to data processing and recommendation engine 160 for creating personalized beauty product recommendations.

Figure 11:
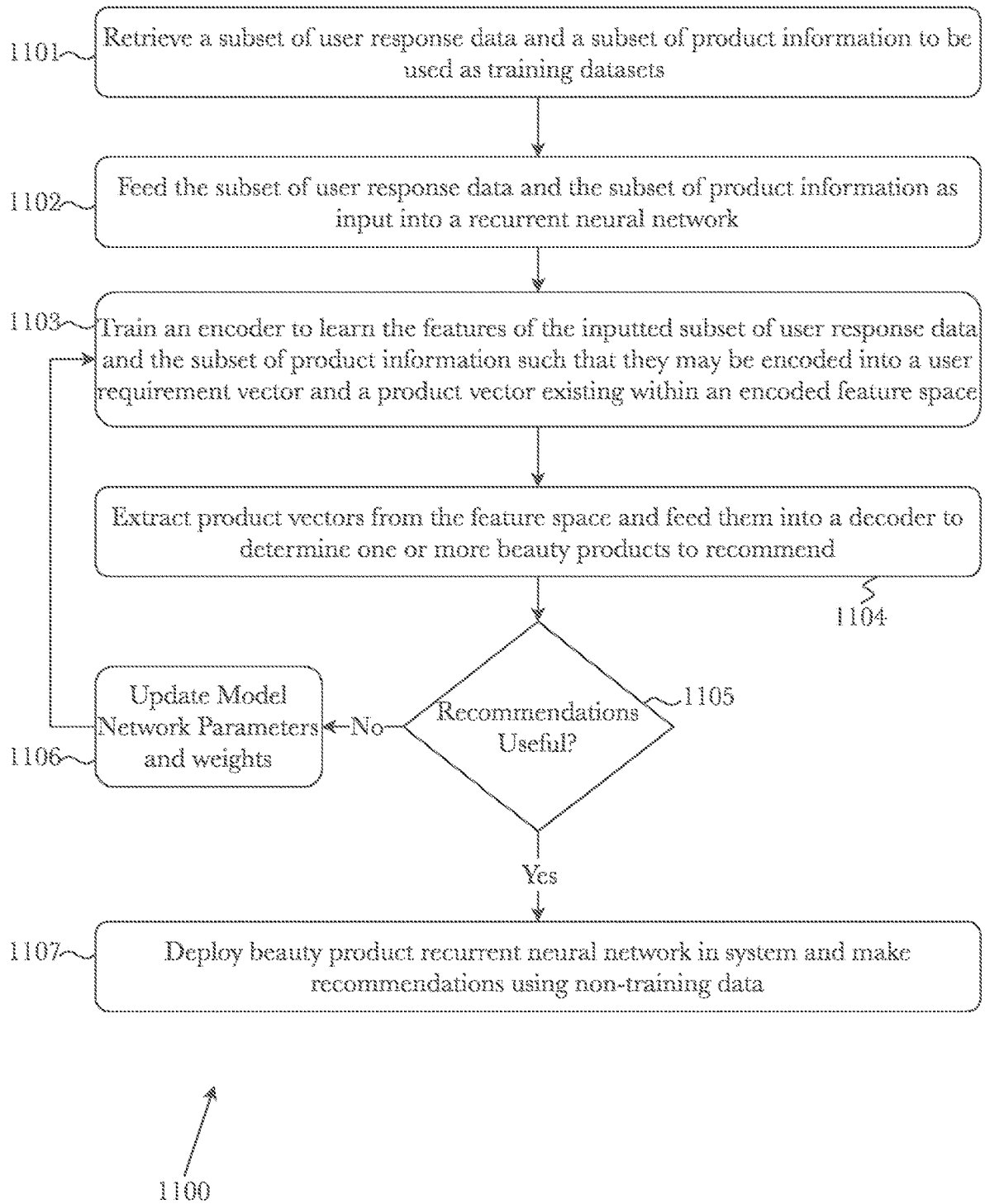
FIG. 11 is a flow diagram illustrating an exemplary method for training a beauty product recurrent neural network for making personalized beauty product recommendations, according to an embodiment.

FIG. 11 is a flow diagram illustrating an exemplary method 1100 for training a beauty product recurrent neural network for making personalized beauty product recommendations, according to an embodiment. According to an embodiment, the training process begins by creating training datasets using retrieved subsets of user response data and product information 1101. The subsets of data may be pre-processed subsets ready to be input into a neural network. The training datasets may then be fed into a recurrent neural network 1102 comprising one or more hidden recurrent layers which may embed the input training datasets and extract weighted features which define the datasets as it passes through each of the one or more hidden recurrent layers. The hidden recurrent layers constitute an encoder. The next step is to train the encoder to learn the features of the inputted subset of user response data and the subset of product information such that they may be encoded into a user requirement vector and a product vector, respectively, existing within an encoded feature space 1103. As a next step, product vectors are extracted from the feature space and fed into a decoder to determine one or more beauty products to recommend 1104. The decoder may comprise one or more fully connected layers. At this point in the training cycle the recommended beauty products may be checked for usefulness as well as validating model performance using a pre-determined criteria for success 1105. If the recommend products are not useful, or model performance does not meet the pre-determined criteria for success, then the networks parameters and weights can be updated to adjust and improve beauty product RNN performance 1106 and then repeat steps 1103-1105 until the pre-determined criteria of success is met. Once the model performance is at a satisfactory level and useful product recommendations are being generated as output, the beauty product RNN may be deployed in system 100 and used to make personalized beauty product recommendations using non-training data 1107.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by Which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 12:
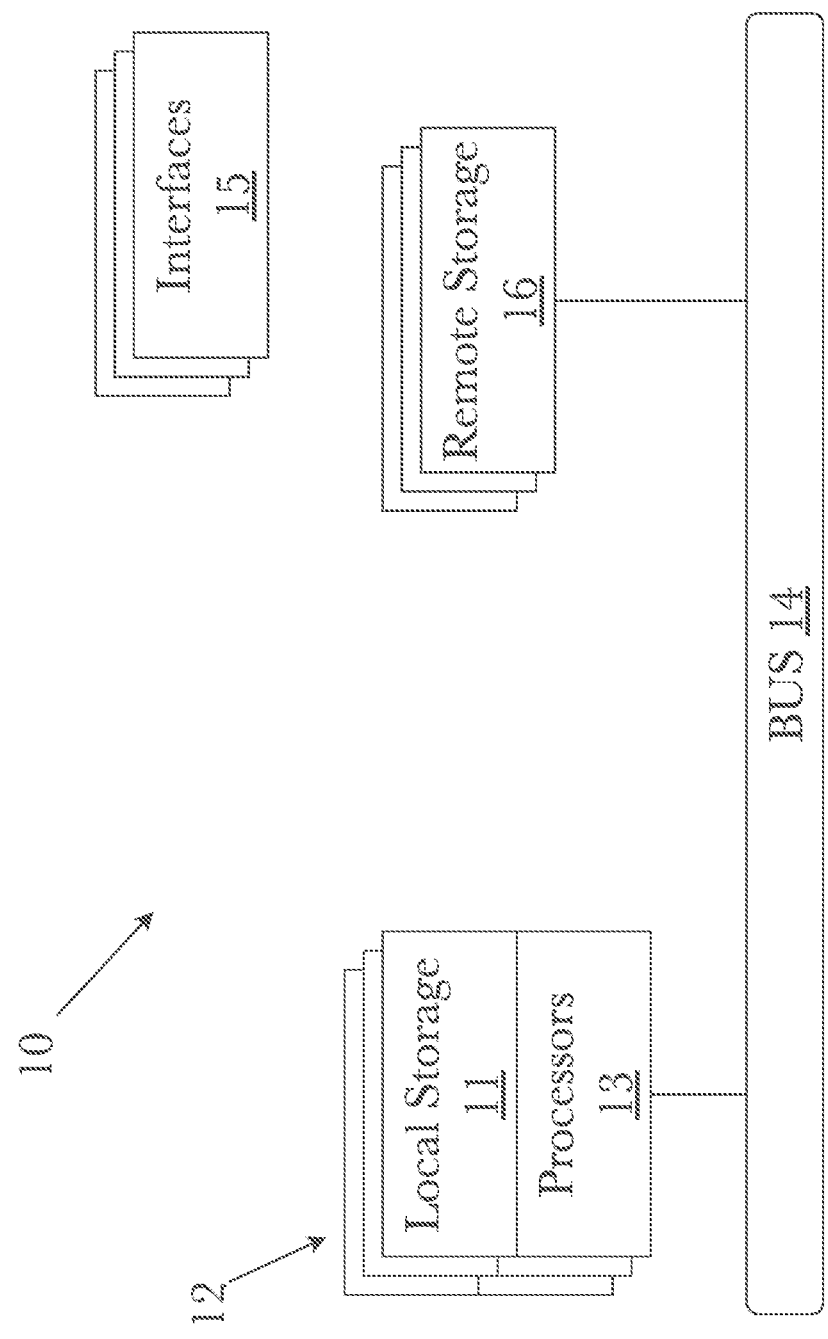
FIG. 12 is a block diagram illustrating an exemplary hardware architecture of a computing device.

Referring now to FIG. 12, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 12 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities maybe implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include, both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
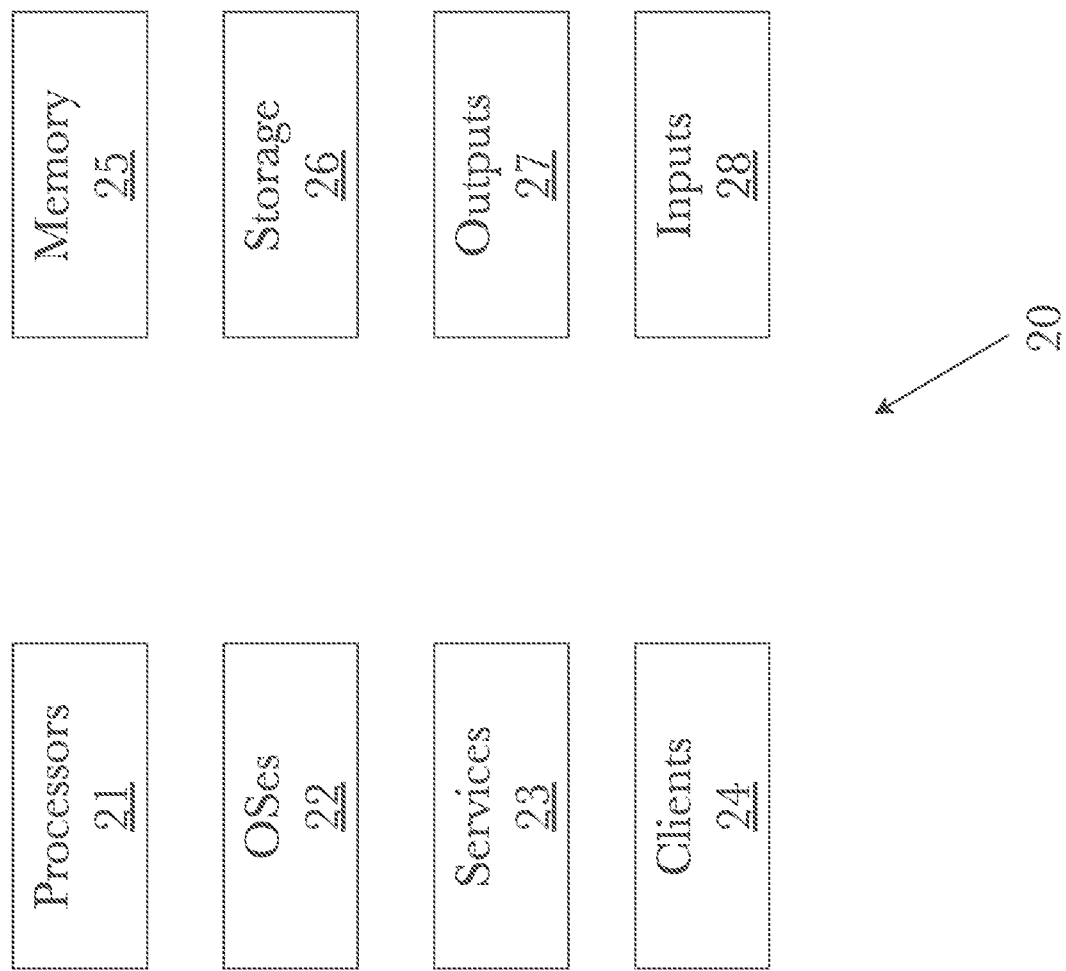
FIG. 13 is a block diagram illustrating an exemplary logical architecture for a client device.

In some aspects, systems maybe implemented on a standalone computing system. Referring now to FIG. 13, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space coalition services in a Linux environment, or any other type of common service architecture used with operating system 21. Input deuces 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 12). Examples of storage devices 26 include flash memory, magnetic hard drive, CD-ROM, and/or the like.

Figure 14:
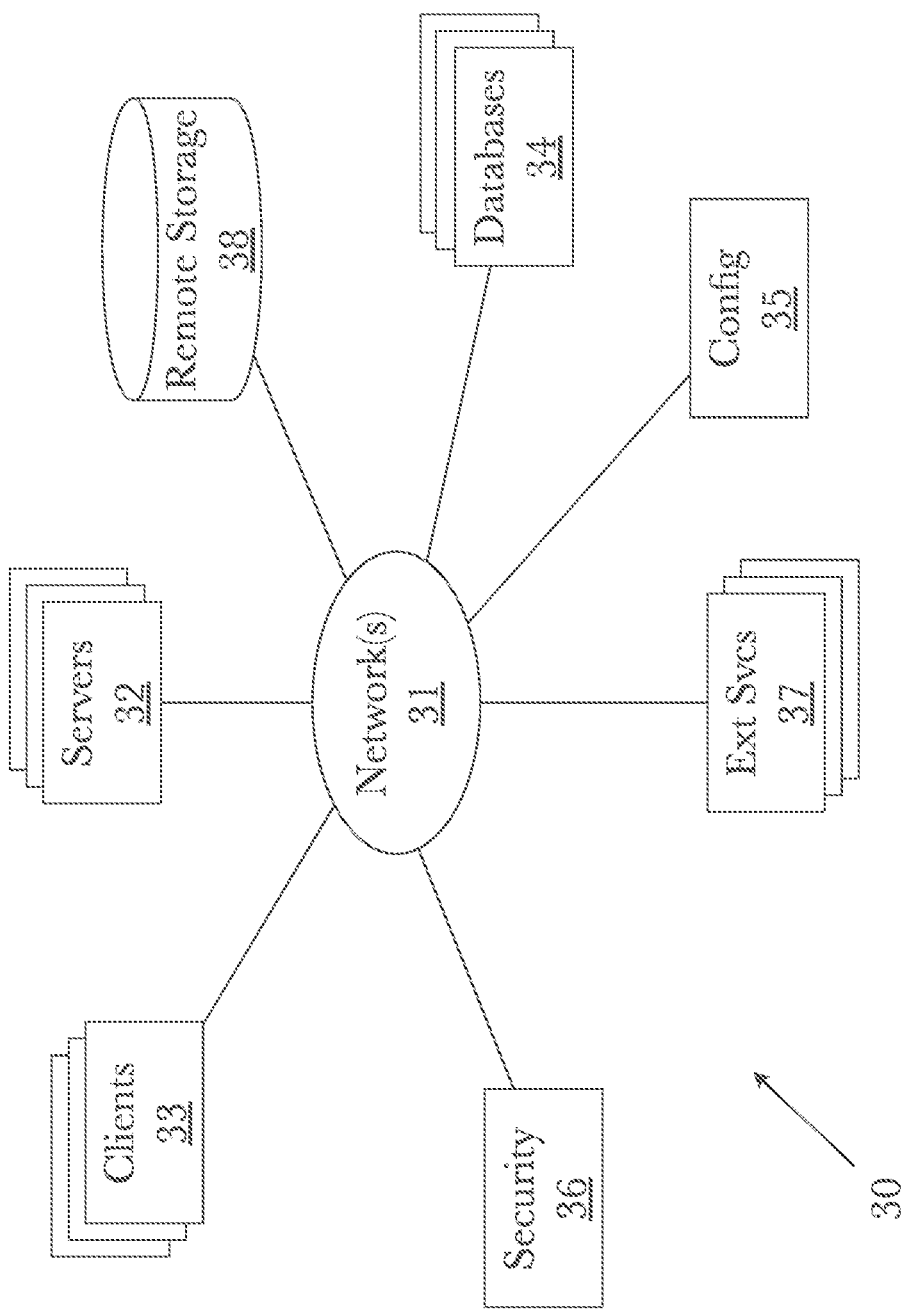
FIG. 14 is a block diagram showing an exemplary architectural arrangement of clients, servers, and external services.

In some aspects, systems may be implemented on a distributed computing network, such as one having any number of clients and/or servers. Referring now to FIG. 14, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 13. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth) or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 15:
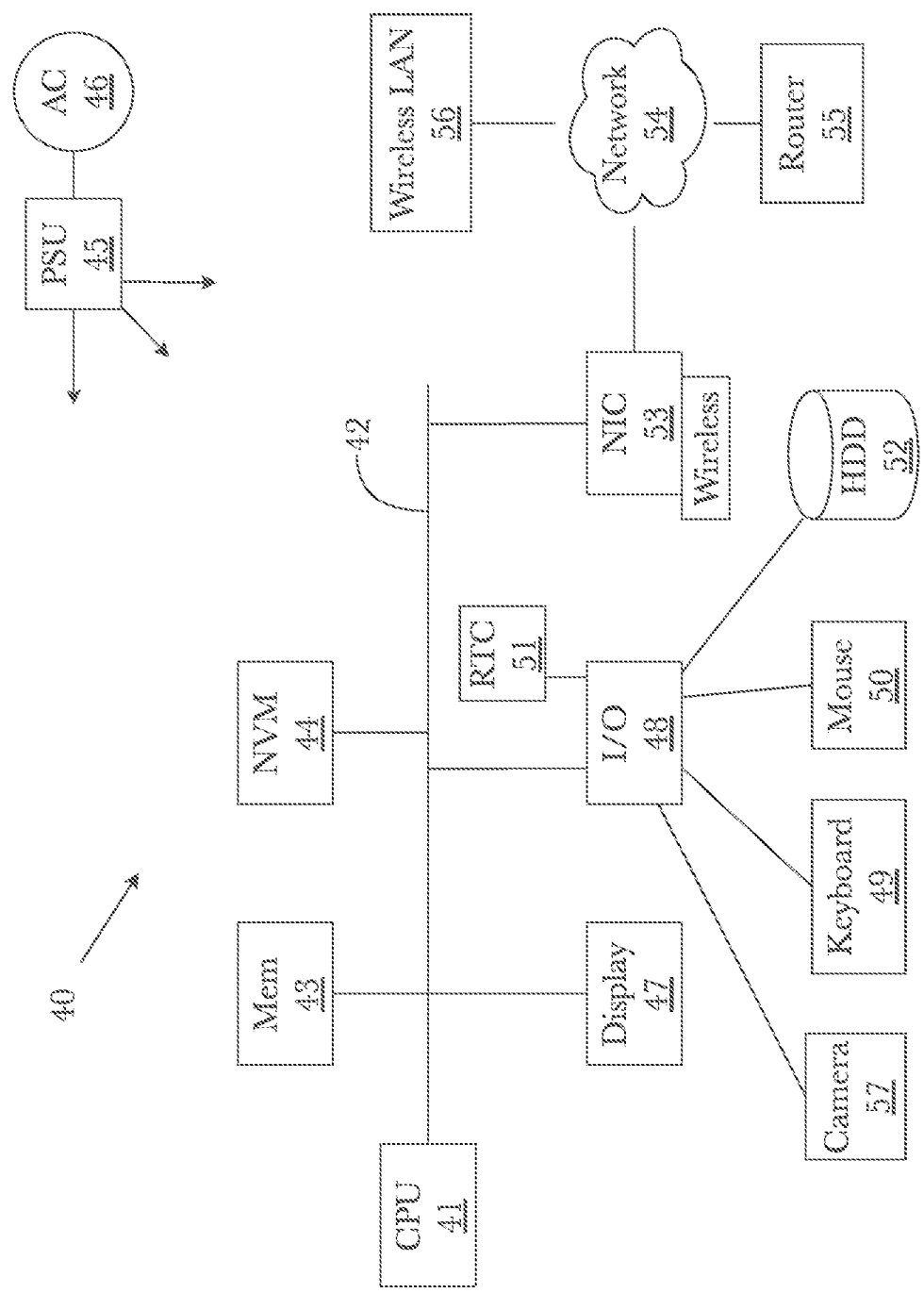
FIG. 15 is another block diagram illustrating an exemplary hardware architecture of a computing device.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices, NIC 53 connects to network 54, which may be the Internet or a local network, which local network may or may not have connections to the Internet. The system may be connected to other computing devices through the network via a router 55 wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for intelligent context-based personalized beauty product recommendation and matching, comprising:
a computer system comprising a memory and a processor;
a data extraction engine, comprising a first plurality of programming instructions stored in the memory and operating on the processor, wherein the first plurality of programming instructions, when operating on the processor, causes the computer system to:
scrape product data from a plurality of data sources accessible via the internet;
store the scraped product data as a product vector in the memory;
receive customer data input responses, the customer data input responses comprising at least a fact-based input, at least a concern-based input, at least a preference-based input, and at least a goal-based input;
create an individual profile of the customer using the customer data input responses and store the individual profile in the memory; and
map the customer data input responses to product requirements and store the mapped customer data input responses in the individual profile;
a data analysis and recommendation engine, comprising a second plurality of programming instructions stored in the memory and operating on the processor, wherein the second plurality of programming instructions, when operating on the processor, causes the computer system to:
retrieve the individual profile from the memory;
retrieve the fact-based input responses and extract environmental conditions from a locational input included in the fact-based input;
combine the mapped customer data input responses and the extracted environmental conditions into a requirement vector;
retrieve one or more product vectors from the memory;
compute the similarity between the requirement vector and the one or more product vectors;
identify the product associated with the product vector that has the highest computed similarity score; and
display the identified product as a recommended product to the customer; and
a skin analysis engine, comprising a third plurality of programming instructions stored in the memory and operating on the processor, wherein the third plurality of programming instructions, when operating on the processor, causes the computer system to:
receive a photograph of the customer;
perform face detection on the photograph;
extract a face oval from the photograph;
eliminate non-skin areas from the extracted face oval;
analyze the extracted face oval with eliminated non-skin areas to generate as outputs a predicted skin-tone and a predicted skin concern;
store the outputted skin-tone and skin concern in the individual profile; and
forward the outputted skin-tone and skin concern to the data analysis and recommendation engine.

2. The system of claim 1, wherein the product data includes ingredients, chemical composition, functions of ingredients, allergens, ingredient free data, benefits, use, and product source information.

3. The system of claim 1, wherein the customer data input responses are received from a questionnaire.

4. The system of claim 1, wherein the customer data input responses are received from an interactive chat bot.

5. The system of claim 1, wherein the data analysis and recommendation engine receives the outputted skin-tone and skin concern and combines them into the requirement vector.

6. The system of claim 1, wherein the similarity is calculated using cosine similarity.

7. The system of claim 1, wherein the similarity is calculated using Euclidian distance.

8. A method for intelligent context-based personalized beauty product recommendation and matching, comprising the steps of:
scraping product data from a plurality of data sources accessible via the internet;
storing the scraped product data as a product vector in the memory;
receiving customer data input responses, the customer data input responses comprising at least a fact-based input, at least a concern-based input, at least a preference-based input, and at least a goal-based input;
receiving a photograph of the customer;
performing face detection on the photograph;
extracting a face oval from the photograph;
eliminating non-skin areas from the extracted face oval;
analyzing the extracted face oval with eliminated non-skin areas to generate as outputs a predicted skin-tone and a predicted skin concern;
creating an individual profile of the customer using the customer data input responses and store the individual profile in the memory;
storing the outputted skin-tone and skin concern in the individual profile;
mapping the customer data input responses to product requirements and storing the mapped customer data input responses in the individual profile;
retrieving the individual profile from the memory;
retrieving the fact-based input responses and extract environmental conditions from a locational input included in the fact-based input;
combining the mapped customer data input responses and the extracted environmental conditions into a requirement vector;
retrieving one or more product vectors from the memory;
computing a similarity between the requirement vector and the one or more product vectors;
identifying the product associated with the product vector that has the highest computed similarity score; and
displaying the identified product as a recommended product to the customer.

9. The method of claim 8, wherein the product data includes ingredients, chemical composition, functions of ingredients, allergens, ingredient free data, benefits, use, and product source information.

10. The method of claim 8, wherein the customer data input responses are received from a questionnaire.

11. The method of claim 8, wherein the customer data input responses are received from an interactive chat bot.

12. The method of claim 8, wherein the data analysis and recommendation engine receives the outputted skin-tone and skin concern and combines them into the requirement vector.

13. The method of claim 8, wherein the similarity is calculated using cosine similarity.

14. The method of claim 8, wherein the similarity is calculated using Euclidian distance.

* * * * *